US012810894B2

(12) United States Patent
Ferrante

(10) Patent No.: US 12,810,894 B2
(45) Date of Patent: Nov. 24, 2026

(54) MAGNETIC RECORDING MEDIA WITH Ni—Pt SEED LAYER

(71) Applicant: Western Digital Technologies, Inc., San Jose, CA (US)

(72) Inventor: Yari Ferrante, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 7 days.

(21) Appl. No.: 18/758,385

(22) Filed: Jun. 28, 2024

(65) Prior Publication Data

US 2026/0004810 A1 Jan. 1, 2026

(51) Int. Cl.
*G11B 5/73* (2006.01)

(52) U.S. Cl.
CPC .......... *G11B 5/7379* (2019.05); *G11B 5/7371* (2019.05); *G11B 5/7377* (2019.05)

(58) Field of Classification Search
CPC .... G11B 5/7379; G11B 5/7377; G11B 5/7371
See application file for complete search history.

(56) References Cited

U.S. PATENT DOCUMENTS 7,211,340 B2 * 5/2007 Nolan .................... G11B 5/672 428/673
7,407,720 B2 8/2008 Girt et al.
8,488,276 B1 7/2013 Jung et al.
11,475,916 B1 10/2022 Tang
2002/0132139 A1 9/2002 Chang et al.
2008/0268293 A1 * 10/2008 Ajan .................... G11B 5/7379 427/131
2013/0170075 A1 7/2013 Dai et al.
2015/0332721 A1 11/2015 Kim et al.

FOREIGN PATENT DOCUMENTS

JP 2008146801 A 6/2008

OTHER PUBLICATIONS

English Machine Translation: Yoshimura et al. (JP 2015-153447).*
(Continued)

*Primary Examiner* — Holly Rickman
*Assistant Examiner* — Linda N Chau
(74) *Attorney, Agent, or Firm* — LOZA & LOZA, LLP; Gabriel Fitch

(57) ABSTRACT

A magnetic recording medium is described that includes a substrate and an amorphous soft underlayer (SUL). An Ni—Pt seed layer is formed on the SUL where the Pt atoms have substitutionally replaced at least some of the Ni atoms within an Ni lattice structure of the Ni—Pt to form a solid solution of Ni—Pt. In some examples, the Ni—Pt seed layer is formed of $Ni_{40}Pt_{60}$. An Ru interlayer is formed on the seed layer. In some examples, the Ni—Pt seed layer has a lattice mismatch with the Ru interlayer of 0.4% or less. A magnetic recording layer is formed on the Ru interlayer. Additional layers or films may be provided. The medium may be configured for use with perpendicular magnetic recording (PMR). A data storage device that includes the magnetic recording medium is described. Methods for fabricating the magnetic recording medium are set forth herein as well.

13 Claims, 9 Drawing Sheets

(56) References Cited

OTHER PUBLICATIONS

STN Transcript.*
Weller, Dieter et al., "Review Article: FePt Heat Assisted Magnetic Recording Media", Journal of Vacuum Science & Technology B; Oct. 26, 2016; vol. 34, Issue 6; https://pubs.aip.org/avs/jvb/article/34/6/060801/103138/Review-Article-FePt-heat-assisted-magnetic; 14 pages.
Varvaro, G. et al., "L1o FePt-Based Thin Films for Future Perpendicular Magnetic Recording Media", Journal of Magnetism and Magnetic Materials; Nov. 2014; vol. 368; https://www.sciencedirect.com/science/article/abs/pii/S0304885314004028; 6 pages.
"Electron Energy Loss Spectroscopy", Wikipedia; Last accessed Jun. 27, 2024; https://en.wikipedia.org/wiki/Electron_energy_loss_spectroscopy; 6 pages.

* cited by examiner

MAGNETIC RECORDING MEDIA WITH Ni—Pt SEED LAYER

FIELD

Aspects of the disclosure relate to magnetic recording media, and more specifically to magnetic recording media designs for perpendicular magnetic recording.

INTRODUCTION

Magnetic storage systems, such as hard disk drives (HDDs), are utilized in a wide variety of devices in both stationary and mobile computing environments. Examples of devices that incorporate magnetic storage systems include data center storage systems, desktop computers, portable notebook computers, portable hard disk drives, network storage systems, high definition television (HDTV) receivers, vehicle control systems, cellular or mobile telephones, television set-top boxes, digital cameras, digital video cameras, video game consoles, and portable media players.

Many magnetic recording disks for use in HDDs are configured for perpendicular magnetic recording (PMR). PMR, also known as conventional magnetic recording (CMR), operates by aligning the poles of magnetic elements of a magnetic recording layer (MRL) perpendicularly to the surface of the disk. The magnetic elements represent bits of data. PMR disk designs often include a seed layer to create a growth template for subsequently deposited films within the recording disk, including one or more ruthenium (Ru)-based interlayers and the MRL, and to provide the correct crystallographic orientation within the Ru interlayer and the MRL, e.g., a hexagonal-close-packed (HCP) crystal structure, e.g., HCP (0001).

It is desirable to provide improvements within seed layers within PMR media or other magnetic recording media to provide, for example, improvements in the areal density capacity (ADC) of the disk. Aspects of the disclosure are directed to these and other ends.

SUMMARY

The following presents a simplified summary of some aspects of the disclosure to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

One aspect of the present disclosure provides a magnetic recording medium configured for magnetic recording. The magnetic recording medium includes: a substrate; an amorphous soft magnetic underlayer (SUL) on the substrate; a seed layer on the SUL and comprising nickel-platinum (Ni—Pt), e.g., an Ni—Pt alloy, where the Pt atoms have substitutionally replaced at least some of the Ni atoms within an Ni lattice structure of the Ni—Pt; an interlayer comprising Ru on the seed layer; and a magnetic recording layer (MRL) on the interlayer. The Ni—Pt seed layer may be, e.g., $Ni_{40}Pt_{60}$. In some aspects, the Ni—Pt seed layer has a lattice mismatch with the Ru interlayer of 1% or less and, in some examples, less than 0.4%. The magnetic recording medium may be a PMR medium. Other layers or films may be provided as well. A data storage device may be provided that includes the magnetic recording medium and a recording head configured to write information to the magnetic recording medium.

Another aspect of the present disclosure provides a method for fabricating a magnetic recording media. The method includes: providing a substrate; providing an amorphous SUL on the substrate; providing a seed layer on the SUL, the seed layer comprising Ni—Pt (e.g., an Ni—Pt alloy) where the Pt atoms have substitutionally replaced at least some of the Ni atoms within an Ni lattice structure of the Ni—Pt; providing an interlayer comprising Ru on the seed layer; and providing an MRL on the interlayer. The Ni—Pt seed layer may be, e.g., configured as $Ni_{40}Pt_{60}$. The magnetic recording medium may be configured as a PMR medium. Other layers or films may be provided as well.

Yet another aspect of the present disclosure provides a magnetic recording medium that includes: a substrate; an amorphous SUL on the substrate; a seed layer on the SUL; an interlayer comprising Ru on the seed layer, wherein the seed layer has a lattice mismatch with the interlayer of 1% or less; and an MRL on the interlayer. The seed layer may be, e.g., $Ni_{40}Pt_{60}$. The magnetic recording medium may be configured as a PMR medium. Other layers or films may be provided as well. A data storage device may be provided that includes the magnetic recording medium and a recording head configured to write information to the magnetic recording medium.

These and other aspects of the disclosure will become more fully understood upon a review of the detailed description, which follows. Other aspects, features, and implementations of the disclosure will become apparent to those of ordinary skill in the art upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. Similarly, while certain implementations may be discussed below as device, system, or method implementations, it should be understood that such implementations can be implemented in various devices, systems, and methods.

BRIEF DESCRIPTION OF THE DRAWINGS

A more particular description is included below with reference to specific aspects illustrated in the appended drawings. Understanding that these drawings depict only certain aspects of the disclosure and are not therefore to be considered to be limiting of its scope, the disclosure is described and explained with additional specificity and detail through the use of the accompanying drawings, in which.

DETAILED DESCRIPTION

Figure 1:
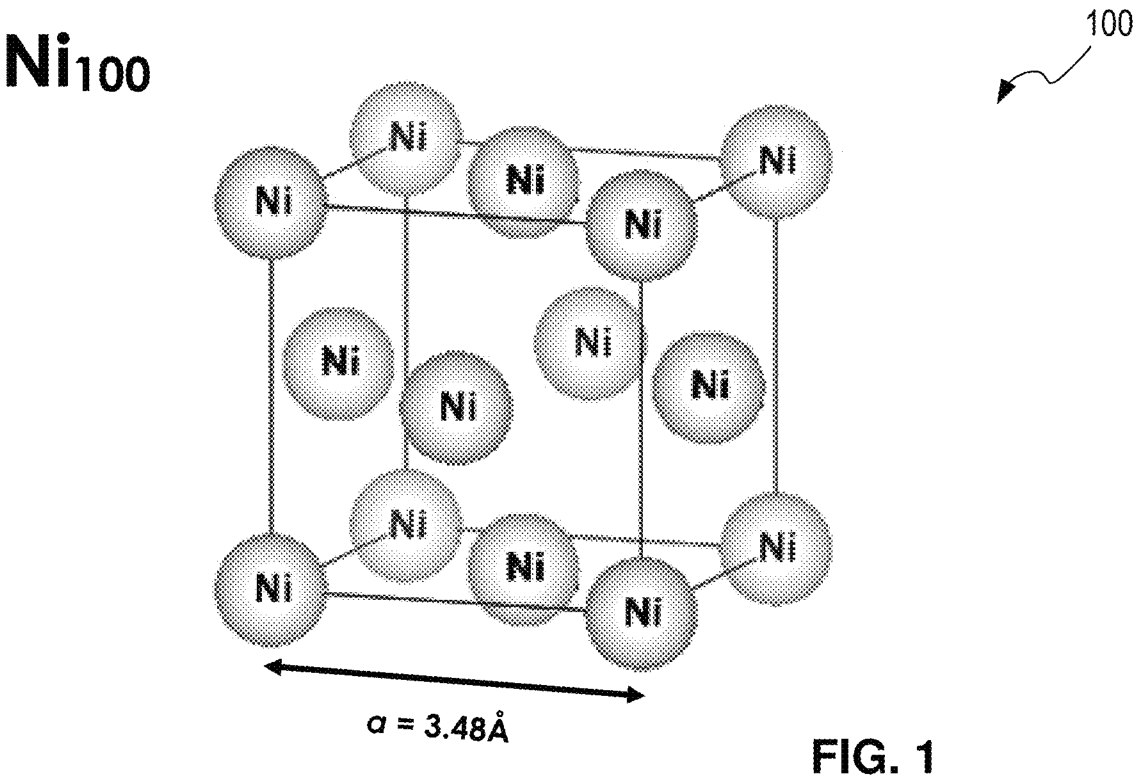
FIG. 1 illustrates a face-centered cubic (FCC) Ni lattice with a lattice constant a of 3.48 Å, which may be used as a seed layer in a PMR magnetic recording medium.

In the following description, specific details are given to provide a thorough understanding of the various aspects of the disclosure. However, it will be understood by one of ordinary skill in the art that the aspects may be practiced without these specific details. For example, circuits may be shown in block diagrams in order to avoid obscuring the aspects in unnecessary detail. In other instances, well-known circuits, structures, and techniques may not be shown in detail in order not to obscure the aspects of the disclosure.

The present disclosure primarily describes a perpendicular magnetic recording (PMR) apparatus and magnetic recording medium. However, at least some aspects of the disclosure may also be applicable to other magnetic recording systems such as heat-assisted magnetic recording (HAMR), in which heat is used to assist in the writing of data to a magnetic recording medium. Note that HAMR is a type of energy-assisted magnetic recording (EAMR), which is a broader term that covers HAMR as well as microwave-assisted magnetic recording (MAMR). Systems that exploit energy-assisted recording within PMR media may be referred to as ePMR systems.

State-of-the-art PMR media include a media stack design that includes a granular magnetic recording layer (MRL) that often consists of an ensemble of CoPtOx-based ferromagnetic and segregated grains that are used for the storage of magnetic information or bits. These materials, in thin-film form, possess a hexagonal-close-packed (HCP) crystal structure with a preferred (0001)-texture and are typically deposited onto one or more non-magnetic HCP Ru-based interlayers (ILs), whose dome-like top surfaces promote the granular morphology of the PMR media stack.

Within the PMR stack, a seed layer is provided, which is usually very thin (~2.0-3.0 nm) and deposited on an amorphous and ferromagnetic soft underlayer (SUL) overlaying an AlMg or glass substrate. The seed layer provides a structural template for the crystalline growth of the HCP Ru-based ILs, which in turn provide a template for the crystalline growth of the HCP MRL. Typical seed layer materials belong to a family of Nickel (Ni)-based or Ni—Fe-based alloys having a face-centered cubic (FCC) crystal structure (e.g., NiFeWAl). Thanks to their preferred (111)-oriented crystallographic texture, the seed layers can promote a desired HCP crystal configuration of the Ru-based ILs and the CoPtOx-based MRL films deposited above them.

Half of the inter-atomic distance of a plane of a typical Ni—Fe-based seed layer is ~2.5 angstrom (Å). As such, the lattice mismatch between the seed layer and the Ru-based ILs (having an in-plane lattice constant of ~2.7 Å) is not negligible and is, e.g., ~7%. It is possible to provide additional Ru-based pre-interlayers (pre-ILs) between Ni- or Ni—Fe-based seed layer and the Ru IL to reduce the lattice mismatch and improve the crystalline properties of the Ru-IL and MRL layers. For example, the in-plane lattice constant can be graded from the seed layer (~2.54 Å) to the Ru-IL (~2.7 Å) by adding multiple pre-IL films with different compositions, but this adds costs and increases the overall thickness of the underlayers beneath the MRL.

Herein, a seed layer is instead described that has an FCC crystal structure but with a larger lattice parameter so as to minimize the lattice mismatch between the seed layer and the Ru-based ILs. The disclosed seed layer (1) helps improve the crystallographic ordering and orientation of the Ru-based ILs and the MRL grains, and (2) allows for a media design with reduced SUL-MRL spacing by decreasing the thickness of the underlayers of the PMR stack, thus leading to improvements in writability and/or reduced grain pitch. The resulting lattice mismatch can be less than 1% and, in some examples, the lattice mismatch is 0.2% or less.

In some aspects, the seed layer consists of Ni doped with platinum (Pt) to provide an Ni—Pt layer (e.g., $Ni_{40}Pt_{60}$) wherein the Pt atoms have substitutionally replaced at least some of the Ni atoms within an Ni lattice structure of the Ni—Pt. Pt is used as a seed layer dopant for at least three reasons: (1) Pt has a larger atomic radius than pure Ni and therefore can increase the lattice parameter of the seed layer (thus reducing the lattice mismatch with the Ru IL); (2) Pt is completely soluble with Ni (at least at the temperatures associated with the fabrication and operation of PMR media) and can therefore maintain a single FCC phase (thus helping to preserve and promote the HCP structure of the Ru IL and the MRL); and (3) Pt can decrease the overall magnetic moment of the seed layer, which is important for cross-track magnetic recording performance control.

Note that an increasing amount of Pt doping into Ni causes the FCC cubic lattice to expand monotonically, thus minimizing the aforementioned lattice mismatch between the seed layer film and a Ru-based IL film. Also, in comparison to a NiFeWAl seed layer, at a given grain pitch, an Ni—Pt seed layer can significantly enhance the crystallographic and morphological properties of the grains of the MRL. This can lead to improved intrinsic signal-to-noise ratio (SNR) in magnetic recording and hence improved areal density capacity (ADC). (Note also that Ni—Pt may also be referred to as NiPt or with other suitable abbreviations.)

Herein, solubility refers to solid state solubility wherein the Ni—Pt seed layer is regarded as a solid solution. A solid solution is a homogeneous mixture of two different kinds of atoms in a solid state and having a single crystal structure. The word "solution" in this context refers to the intimate mixing of the Ni and Pt at the atomic level and is distinct from a mere physical mixture of the Ni and Pt. In general, if two compounds are isostructural, then a solid solution can exist between the compounds. Ni and Pt are isostructural. In this context, Ni is the solvent and Pt is the solute.

Generally speaking, a solute (e.g., Pt) may incorporate into a solvent crystal lattice (e.g., a Ni lattice) substitutionally (by replacing a solvent particle in the lattice) or interstitially (by fitting into the space between solvent particles). Herein, the solubility being described is substitutional, i.e., the Pt atoms replace some of the Ni atoms within the Ni lattice. Since the atomic radii of Pt is larger than Ni, the unit cell of the lattice thereby expands to accommodate the Pt. This miscibility is shown by way of FIGS. 1 and 2.

FIG. 1 illustrates an FCC Ni lattice 100 with no Pt. That is, the lattice of FIG. 1 is $Ni_{100}$. As shown in the figure, the lattice constant is a=3.48 Å.

Figure 2:
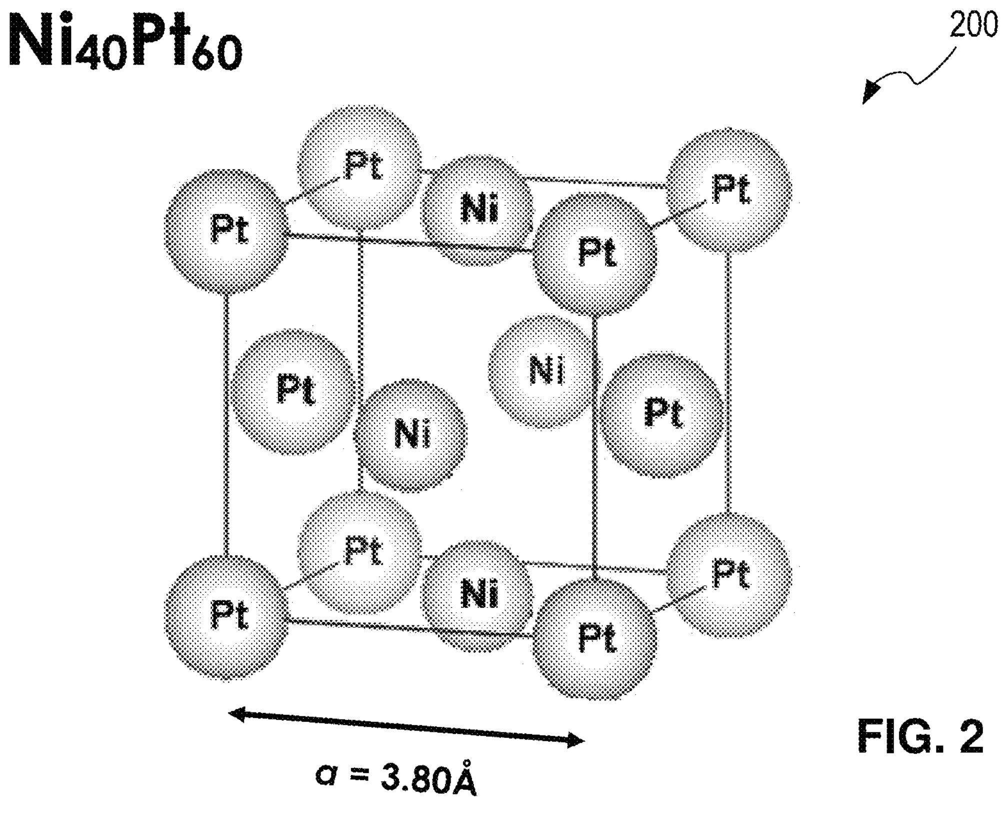
FIG. 2 illustrates an FCC Ni—Pt lattice formed with 40% Ni and 60% Pt with a lattice constant a of 3.80 Å, in accordance with aspects of the disclosure.

FIG. 2 illustrates an FCC solid solution Ni—Pt lattice 200 with 40% Ni and 60% Pt, where the percentages are atomic percentages (at. %). As shown in the figure, the resulting lattice constant is a=3.80 Å. That is, the lattice constant for $Ni_{40}Pt_{60}$ is larger than that of $Ni_{100}$. The larger lattice constant serves to reduce the lattice mismatch between the seed layer and the Ru-based IL grown on it (as compared to the Ni-only lattice of FIG. 1). Note that in FIG. 2, the Pt atoms have substitutionally replaced Ni atoms within the Ni lattice while maintaining the same FCC structure. If the Pt were insoluble within Ni (e.g. by having a different phase), then Pt atoms could instead act as a segregant to the Ni, or if the solubility of Pt within the Ni lattice were interstitial rather than substitutional, then Pt atoms would disrupt the FCC structure. Note also that in an example where the seed layer is pure Pt with no Ni (i.e., $Pt_{100}$), the lattice constant would be a=3.92 Å.

Thus, in one aspect, a magnetic recording medium is described herein that includes: a substrate; an amorphous SUL on the substrate; and an Ni—Pt seed layer on the SUL wherein the Pt atoms have substitutionally replaced at least some of the Ni atoms within an Ni lattice structure of the Ni—Pt. An Ru IL is on the seed layer. An MRL is formed on the Ru interlayer. Additional layers may be provided. Methods for fabricating the magnetic recording medium are set forth herein as well.

In another aspect, a magnetic recording medium is described herein that includes: a substrate; an amorphous SUL on the substrate; and a seed layer on the SUL. An Ru IL is on the seed layer, wherein the seed layer has a lattice mismatch with the Ru IL of 1% or less, and, e.g., of 0.4% or less. An MRL is formed on the Ru IL. The seed layer may be Ni—Pt. Additional layers may be provided. Methods for fabricating the magnetic recording medium are set forth herein as well.

Among other advantages, the magnetic recording media described herein can serve to: (1) provide an improvement, at a given grain pitch, to the crystallographic ordering and orientation of the Ru-based ILs and the MRL grains, as compared to conventional seed layers (e.g., a NiFeWAl seed layer); (2) provide an improvement, at a given grain pitch, to the surface roughness of the magnetic recording media, as compared to conventional seed layers; and (3) provide an improvement, at a given magnetic track width, to the untrimmed (on-track) and trimmed SNR, as compared to conventional seed layers. Furthermore, Hc (coercive field) and KuV/kT (thermal stability factor) values obtained when using a conventional seed layer (e.g., a NiFeWAl seed) can be matched at a smaller center-to-center (CTC) spacing by using a $Ni_{40}Pt_{60}$ seed layer. This is likely due to the improved crystal ordering. (Note that within "KuV/kT", the Ku represents an anisotropy constant, V represents a volume, k represents a Boltzmann constant, and T represents an absolute temperature.)

Illustrative Examples and Embodiments

Figure 3:
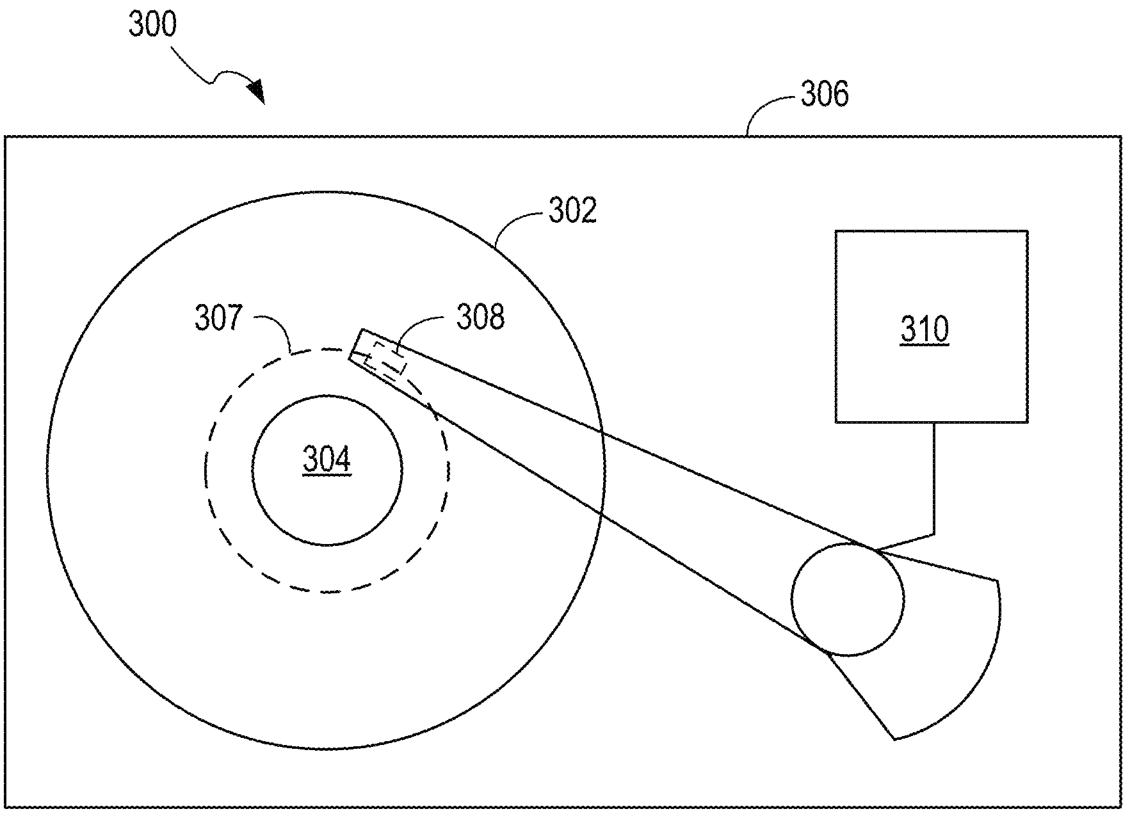
FIG. 3 is a top schematic view of a data storage device configured for magnetic recording and including a magnetic recording medium having an Ni—Pt seed layer in accordance with some aspects of the disclosure.

FIG. 3 is a top schematic view of a data storage device (e.g., disk drive) 300 configured for magnetic recording and including a magnetic recording medium 302 with an Ni—Pt seed layer (wherein the Pt atoms have substitutionally replaced at least some of the Ni atoms within an Ni lattice structure of the Ni—Pt), an Ru-based IL, and an MRL. In the main examples described herein, the magnetic recording medium 302 is configured as a PMR medium. The disk drive 300 may include one or more disks/media 302 to store data. The disk/media 302 resides on a spindle assembly 304 that is mounted to drive housing 306. Data may be stored along tracks 307 in the magnetic recording layer of disk 302. The reading and writing of data are accomplished with the head/slider 308 that may have both read and write elements. The write element is used to alter the magnetization direction of a portion of the magnetic recording layer of disk 302 and thereby write information thereto. The head 308 may have magneto-resistive (MR) based elements, such as tunnel magneto-resistive (TMR) for reading, and a write pole with coils that can be energized for writing. In operation, a spindle motor (not shown) rotates the spindle assembly 304, and thereby rotates disk 302 to position head 308 at a particular location along a desired disk track 307. The position of the head 308 relative to the disk 302 may be controlled by position control circuitry 310 of the disk drive 300.

Figure 4:
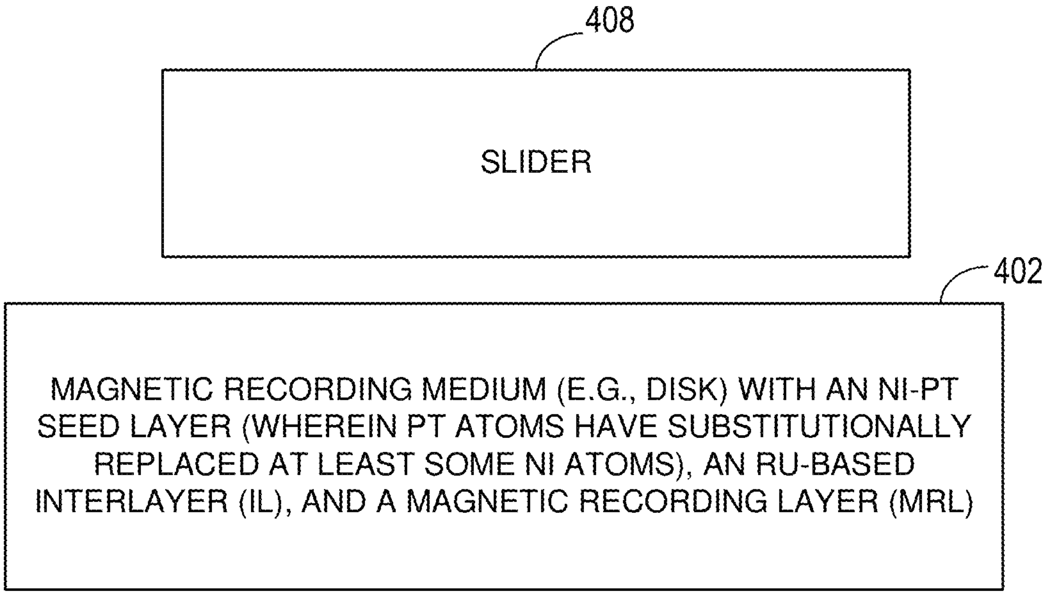
FIG. 4 is a side cross-sectional schematic view of selected components of the data storage device of FIG. 3 including the magnetic recording medium having an Ni—Pt seed layer wherein Pt atoms have substitutionally replaced Ni atoms, in accordance with some aspects of the disclosure.

FIG. 4 is a side cross-sectional schematic view of selected components of the data storage device of FIG. 3 including the magnetic recording medium 402 (corresponding to disk/media 302 of FIG. 3) with the Ni—Pt seed layer (wherein the Pt atoms have substitutionally replaced at least some of the Ni atoms within an Ni lattice structure of the Ni—Pt). The head/slider 408 (corresponding to head 308 of FIG. 3) is positioned above the medium 302. The head/slider 408 includes a write element and a read element (not shown) positioned along an air-bearing surface (ABS) of the slider (e.g., bottom surface) for writing information to, and reading information from the medium 402. FIGS. 3 and 4 illustrate a specific example of a magnetic recording system. In other examples, embodiments of the improved media with the Ni—Pt seed layer disclosed herein can be used in any suitable magnetic recording system. For simplicity of description, the various embodiments are primarily described in the context of an example HDD magnetic recording system.

Figure 5:
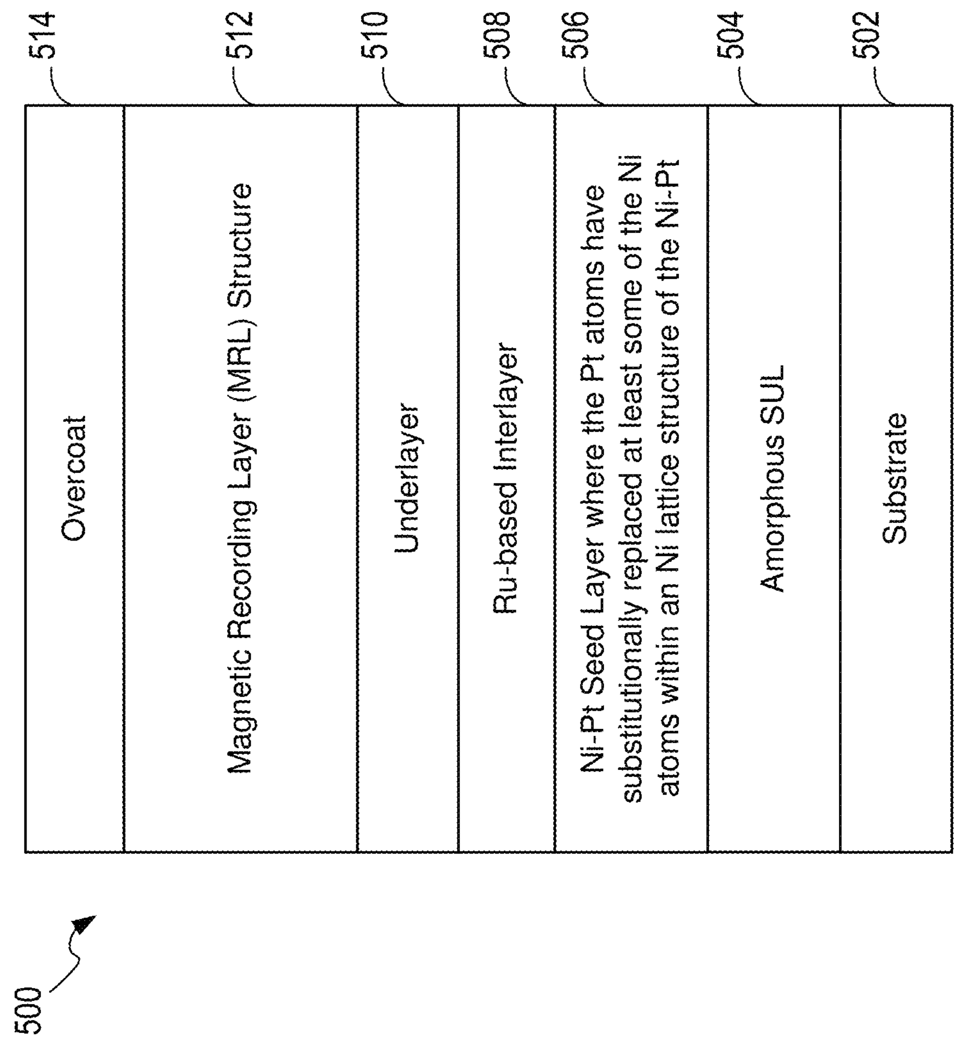
FIG. 5 is a side cross-sectional schematic view of a magnetic recording medium with an Ni—Pt seed layer, in accordance with some aspects of the disclosure.

FIG. 5 is a side cross-sectional schematic view of a magnetic recording medium 500 with an Ni—Pt seed layer that can be used in conjunction with the disk drive 300 of FIGS. 3 and 4. In the main examples described herein, the magnetic recording medium 500 is configured for PMR. The magnetic recording medium 500 has a stacked structure. In sequence from the bottom, the medium 500 includes a substrate 502, an amorphous SUL 504, an Ni—Pt seed layer 506 wherein the Pt atoms have substitutionally replaced at least some of the Ni atoms within an Ni lattice structure of the Ni—Pt, an Ru-based interlayer 508, an underlayer 510, an MRL structure 512, and an overcoat layer 514. In some examples, the MRL structure 512 has multiple magnetic recording layers and multiple non-magnetic exchange control layers (ECLs). Additional layers or films may be provided.

The substrate 502 can be made of one or more materials such as an aluminum (Al) alloy, nickel-phosphorus (NiP)-plated Al, glass, glass ceramic, and/or combinations thereof. In one embodiment, the substrate 502 may be a rigid substrate (e.g., glass or ceramic).

The amorphous SUL 504 can be made of one or more ferromagnetic materials with high permeability, high saturation magnetization and low coercivity, such as cobalt (Co), iron (Fe), molybdenum (Mo), tantalum (Ta), niobium (Nb), boron (B), chromium (Cr), or other soft magnetic materials, or combinations thereof. The amorphous SUL 504 may include an amorphous compound or combination of Co and Fe (e.g., a CoFe alloy) with the addition of one or more non-magnetic elements from Mo, Nb, Ta, W, and B. The SUL 504 may be configured to support magnetization of the magnetic recording layer structure 512 during data storage operations. More specifically, the amorphous SUL 504 may be configured to provide a return path for a magnetic field applied during a write operation.

The amorphous SUL 504 has a thickness in the range of 80 to 180 Angstroms. In one embodiment, the thickness of the amorphous SUL 504 is 150 Angstroms.

The seed layer 506 may be Ni—Pt wherein the Pt atoms have substitutionally replaced at least some of the Ni atoms within an Ni lattice structure of the Ni—Pt. The atomic percentage of Pt in the Ni—Pt may be, for example, in the range of 20-90 at. %, or in the range of 40-80 at. %, or in the range of 50-70 at. %, or, in some examples, the Pt is 60 at. %, e.g., the compound is $Ni_{40}$—$Pt_{60}$. In other examples, the Pt is 50 at. % or more and, in some examples, the Pt may be at 100%, i.e., the seed layer is pure Pt with no Ni.

The seed layer 506 has a lattice structure and crystallographic orientation that can determine the crystallographic orientation of a layer (e.g., Ru-based IL 508) grown/deposited on the seed layer 506. In some aspects, the seed layer has an FCC crystallographic structure with the (111) planes parallel to the film surface. In some examples, the Ni—Pt of the seed layer has half of the inter-atomic distance of its plane in the range of 2.5 angstroms to 2.7 angstroms. The Ni—Pt of the seed layer may be configured to have a lattice mismatch with the Ru-based IL 508 of 5% or less, or in other examples, of 1% or less, or, in other examples, of 0.4% or less. In some aspects, the Ni—Pt seed layer 506 does not include any oxide (or, if any oxides are present, they are minimal impurities). In some aspects, the seed layer consists essentially of Ni—Pt. Herein, "consisting essentially of Ni—Pt" means the material composition of the seed layer is at least 99% Ni—Pt. In some examples, the seed layer 506 has a thickness in the range of 20 to 40 Angstroms.

In some examples, the seed layer 506 includes two or more seed layers with Ni—Pt, each having a different atomic percentage of Pt, e.g., the atomic percentages can be graded with an increasing percentage of Pt closer to the Ru-based IL. (See, FIG. 7, discussed below.)

Figure 6:
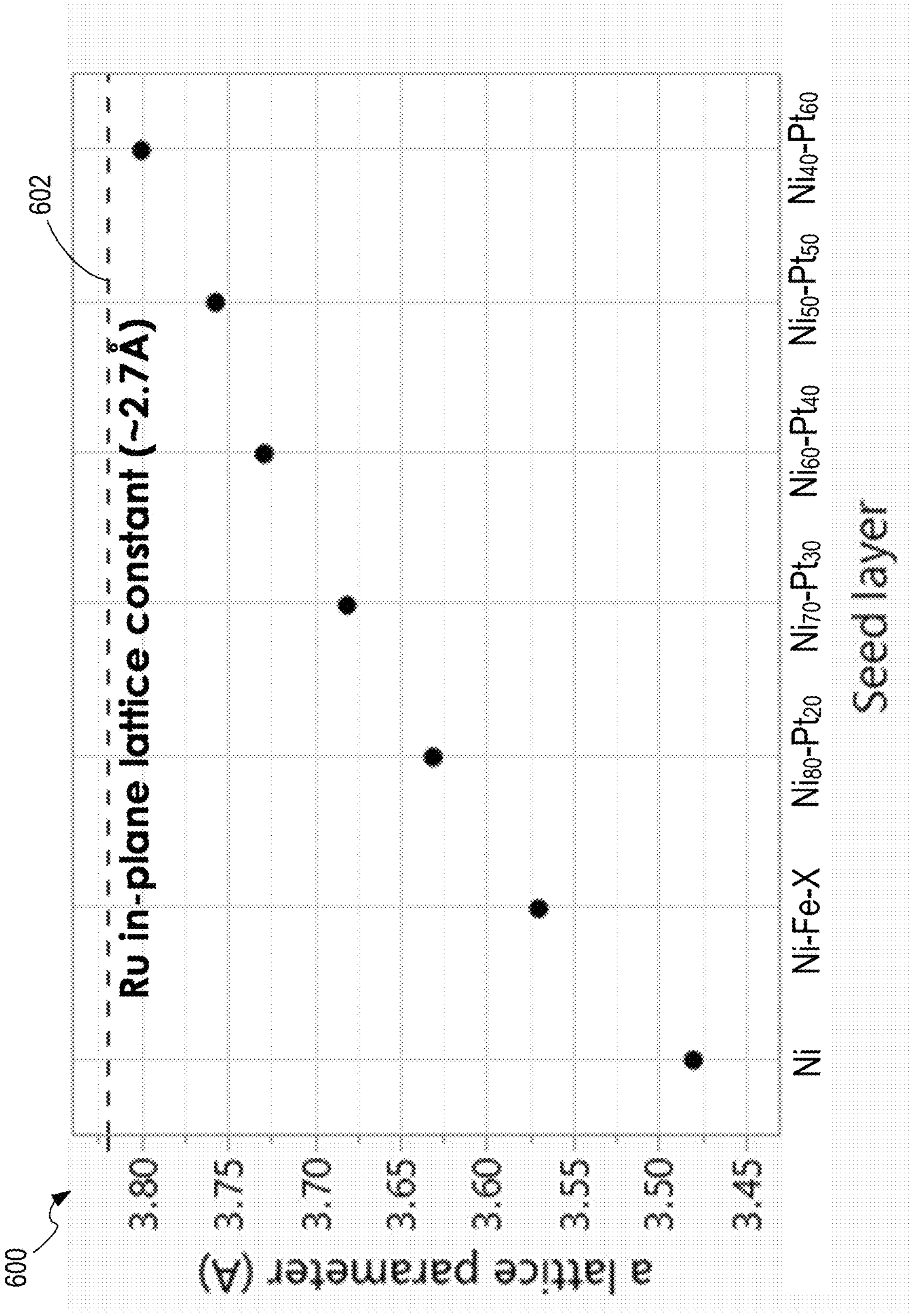
FIG. 6 is a graph illustrating the lattice parameter a in Angstroms for various FCC Ni—Pt seed layers having different percentages of Pt in the Ni—Pt, in accordance with some aspects of the disclosure, with data obtained from in-plane X-Ray Diffraction measurements.

FIG. 6 is a graph 600 illustrating the lattice parameter a in Angstroms for various FCC seed layers, including seed layers having different percentages of Pt in the Ni—Pt substitutional alloy. As shown, a seed layer having pure Ni has a lattice parameter of about a=3.48 Å. (See, again, FIG. 1.) A seed layer formed of Ni—Fe—X (where X is, e.g., WAI) has a lattice parameter of about a=3.57 Å. The lattice parameters for various Ni—Pt compositions are also provided in graph 600. A line 602 represents the HCP Ru in-plane lattice constant of ~2.7 Å. As shown, the lattice parameter for $Ni_{40}Pt_{60}$ (a=3.8 Å) allows for half of its inter-atomic distance (~2.687 Å) to be very similar to that of the Ru-IL in-plane lattice constant (~2.7 Å) and hence is a good choice for reducing lattice mismatch.

TABLE I provides further information for different Ni—Pt compositions, with $Ni_{40}$—$Pt_{60}$ providing a lattice mismatch relative to Ru of only 0.4%.

TABLE I

| FCC Seed Layer Compound | 2-Theta (°) | d (Å) | Lattice constant α (Å) | [111] plane inter-atomic distance *0.5 (Å) | Lattice mismatch with HCP Ru-IL (2.7 Å) |
|---|---|---|---|---|---|
| $Ni_{100}$ | 76.38 | 1.246 | 3.48 | 2.46 | −9.8% |
| $Ni_{80}Pt_{20}$ | 73.75 | 1.284 | 3.64 | 2.58 | −5.2% |
| $Ni_{70}Pt_{30}$ | 72.58 | 1.301 | 3.68 | 2.60 | −3.8% |
| $Ni_{60}Pt_{40}$ | 71.52 | 1.318 | 3.73 | 2.64 | −2.4% |
| $Ni_{50}Pt_{50}$ | 70.90 | 1.328 | 3.76 | 2.66 | −1.5% |
| $Ni_{40}Pt_{60}$ | 69.99 | 1.343 | 3.80 | 2.69 | −0.4% |
| $Ni_{20}Pt_{80}$ | 68.62 | 1.367 | 3.87 | 2.74 | 1.5% |

Returning now to FIG. 5, the Ru-based IL 508 may include pure Ru. In other examples, the Ru-based IL 508 may include Ru and other compounds. For example, the IL 508 may be CoCrRu and CoCrRuW. The particular amount of W to employ within the IL 508 may depend on the materials and configurations of the adjacent layers as well as the relative amounts of Co, Cr, and Ru in the interlayer. The Ru-based IL 508 may comprise, for example, one of 50% Co, 25% Cr, and 25% Ru (Co50Cr25Ru25) and 45% Co, 25% Cr, 25% Ru, and 5% W (Co45Cr25Ru25W5), wherein the respective percentages are atomic percentages.

Note that the lattice parameter for IL layers that include Ru along with additional elements (such as Co, Cr, and W) may differ from the lattice parameter for a pure Ru IL. Hence, the choice of Ni—Pt seed layer composition may differ. That is, rather than using $Ni_{40}Pt_{60}$, a different Ni—Pt composition such as $Ni_{60}Pt_{40}$ might provide a better match with the Ru-based IL to reduce lattice mismatch. Thus, in some examples, the optimal or preferred Ni—Pt seed composition may be determined by measuring or otherwise determining the lattice constant for the particular IL composition to be used, and then comparing that lattice constant with the data in TABLE I to identify the best match for the Ni—Pt composition. Note that the Ni—Pt composition is not limited to just the examples of TABLE I. The relative atomic percentages can be set to any suitable value such as, e.g., $Ni_{42}Pt_{58}$ or $Ni_{49}Pt_{51}$, etc.

The underlayer 510, which is optional in some embodiments, may be made of one or more materials such as Ru and/or other suitable materials known in the art.

The MRL 512 may be made of CoPt or an alloy selected from Co—Pt—X, where X is a material selected from Cr and various oxides, and combinations thereof. In some examples, the crystallographic orientation of the MRL 314 can facilitate PMR.

The overcoat 514 may be made of one or more materials such as carbon (C) and/or other suitable materials known in the art. In one embodiment, the medium 500 may also include a lubricant layer on the overcoat layer. In such case, the lubricant layer can be made of one or more materials such as a polymer-based lubricant and/or other suitable materials known in the art.

As noted above, in some examples, the Ni—Pt seed layer (e.g. seed layer 506) includes two or more seed layers with Ni—Pt, each having a different atomic percentage of Pt, e.g., the atomic percentages can be graded, scaled, or otherwise varied to have an increasing percentage of Pt closer to the Ru-based IL. This is illustrated in FIG. 7.

Figure 7:
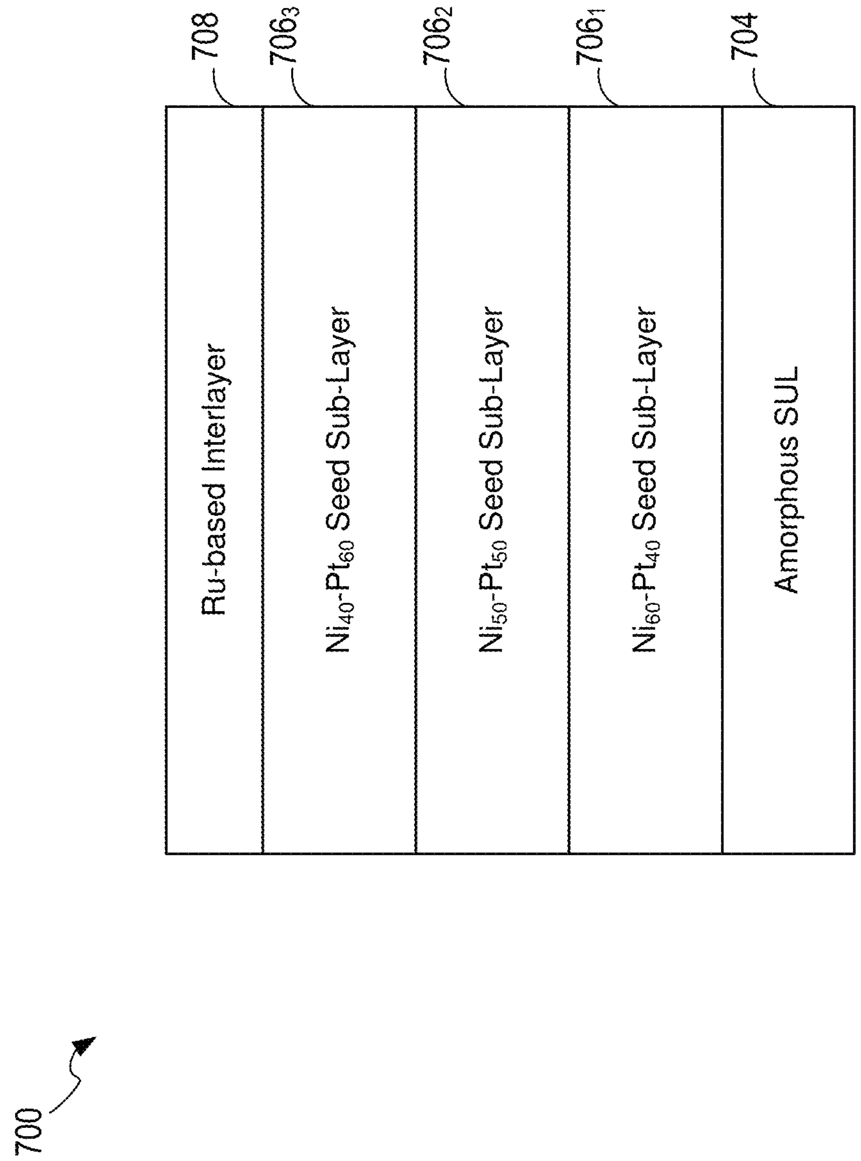
FIG. 7 is a side cross-sectional schematic view of a portion of a magnetic recording medium with a set of graded Ni—Pt seed layers between an amorphous SUL and an Ru-based IL, in accordance with some aspects of the disclosure.

FIG. 7 is a side cross-sectional schematic view of a portion of a magnetic recording medium 700 with a set of graded Ni—Pt seed layers between an amorphous SUL 704 and an Ru-based IL 708. In this example, the Ni—Pt seed layer 706 includes: a first sub-layer 7061 formed of $Ni_{60}$—$Pt_{40}$ that is directly on the SUL 704; a second sub-layer 7062 formed of $Ni_{50}$—$Pt_{50}$ that is directly of the first sub-layer 7061; and a third sub-layer 7063 formed of $Ni_{40}$—$Pt_{60}$ that is directly of the second sub-layer 7062. FIG. 7 represents just one example of a graded Ni—Pt seed layer, which could have more or fewer sublayers with different relative atomic percentages than in the specific example shown. Note also that each of the sub-layers has Pt atoms substitutionally replacing Ni atoms, as described above.

Figure 8:
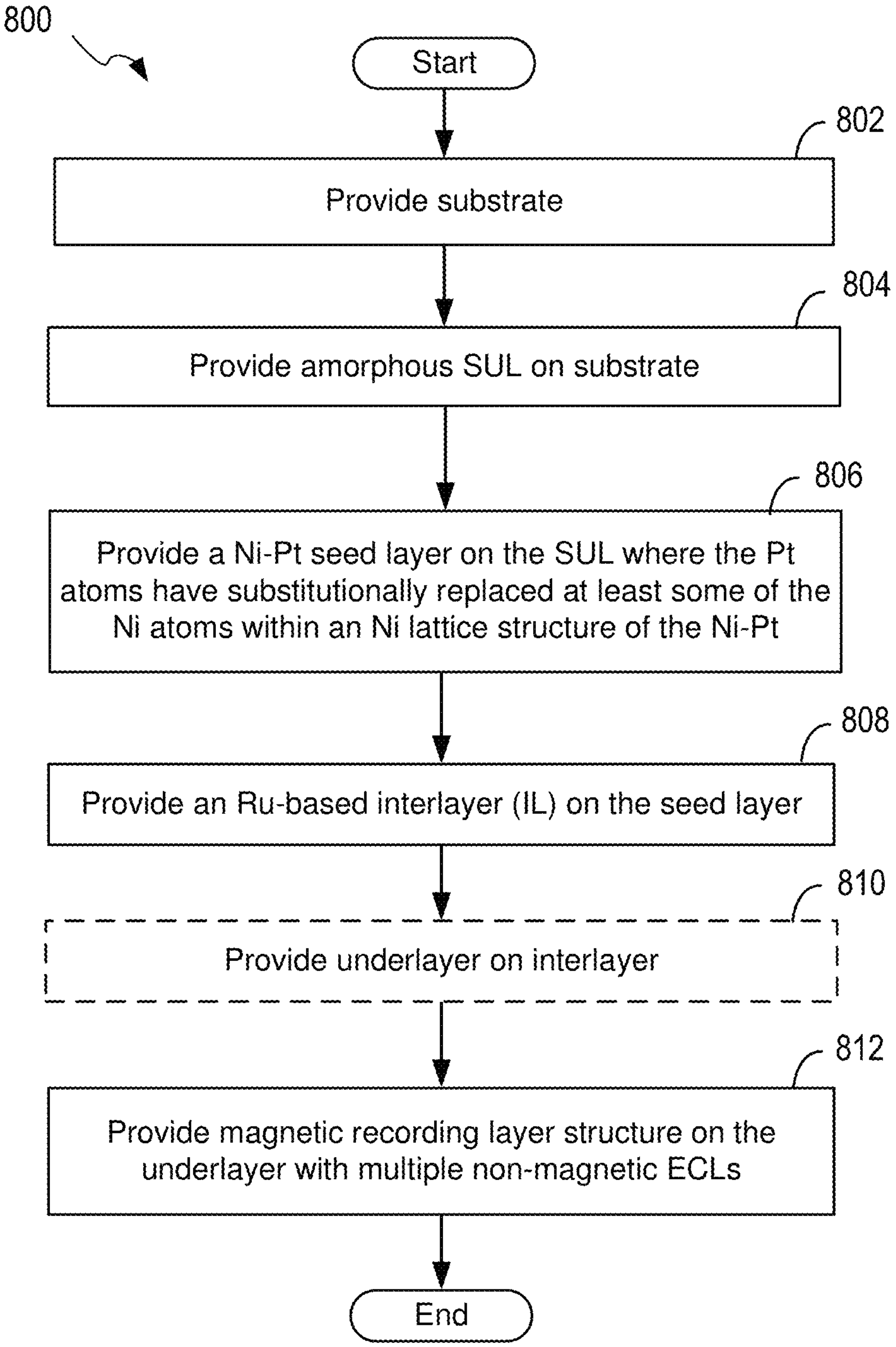
FIG. 8 is a flowchart of a process for fabricating a magnetic recording medium having an Ni—Pt seed layer wherein Pt atoms have substitutionally replaced Ni atoms, in accordance with some aspects of the disclosure.

FIG. 8 is a flowchart of a process 800 for fabricating a magnetic recording medium including a magnetic recording layer structure. In particular embodiments, the process 800 can be used to fabricate the magnetic recording media described above including medium 302 and/or medium 500.

At block 802, the process provides a substrate. The substrate can be made of one or more materials such as an Al alloy, NiP-plated Al, glass, glass ceramic, and/or combinations thereof.

At block 804, a soft magnetic underlayer (e.g., SUL 504 in FIG. 5) is provided on the substrate. The amorphous SUL 504 can be made of one or more materials with high permeability, high saturation magnetization and low coercivity, such as cobalt (Co), iron (Fe), molybdenum (Mo), tantalum (Ta), niobium (Nb), boron (B), chromium (Cr), or other soft magnetic materials, or combinations thereof. The amorphous SUL 504 may include an amorphous compound or combination of Co and Fe (e.g., a CoFe alloy) with the addition of one or more elements from Mo, Nb, Ta, W, and B.

At block 806, an Ni—Pt seed layer is provided on the SUL where the Pt atoms have substitutionally replaced at least some of the Ni atoms within an Ni lattice structure of the Ni—Pt. The atomic percentage of Pt in the Ni—Pt may be, for example, in the range of 20-90 at. %, or in the range of 40-80 at. %, or in the range of 50-70 at. %, or, in some examples, the Pt is 60 at. %, e.g., $Ni_{40}$—$Pt_{60}$. In other examples, the Pt is 50 at. % or more. The Ni—Pt of the seed layer may be configured to have a lattice mismatch with a subsequently deposited Ru-based IL of 5% or less, or in other examples, of 1% or less, or, in other examples, of 0.4% or less. For example, low-power, low-pressure, low-temperature sputter deposition may be employed using a target formed of Ni—Pt alloy and a sputtering gas such as Argon. Ni—Pt material is ejected from the target and collects on the SUL of a media disk being fabricated to form the Ni-PT seed layer on the SUL. By providing an Ni—Pt alloy for the target having selected atomic percentages for Ni and Pt, the relative atomic percentages of the Ni—Pt seed layer on the SUL may be controlled. For example, if the Ni—Pt target is $Ni_{40}$—$Pt_{60}$, then a seed layer of $Ni_{40}$—$Pt_{60}$ will be deposited on the SUL. Other suitable deposition techniques may be used as well.

At block 808, an Ru-based interlayer is provided on the seed layer.

At block 810, an underlayer may optionally be provided on the interlayer. The underlayer may be made of one or more materials such as Ru and/or other suitable materials known in the art.

At block 812, a magnetic recording layer structure (e.g., MRL structure 512 in FIG. 5) is provided on the underlayer. In some embodiments, the magnetic recording layer structure has or includes multiple non-magnetic ECLs. In one embodiment, an overcoat (e.g., overcoat layer 514 in FIG. 5) may be provided on the magnetic recording layer structure.

In several embodiments, the forming or deposition of the various layers of the magnetic recording media described herein can be performed using a variety of deposition sub-processes, including, but not limited to physical vapor deposition (PVD), direct current (DC) magnetron sputter deposition, ion beam deposition, radio frequency sputter deposition, or chemical vapor deposition (CVD), including plasma enhanced chemical vapor deposition (PECVD), low pressure chemical vapor deposition (LPCVD) and atomic layer chemical vapor deposition (ALCVD). In other embodiments, other suitable deposition techniques known in the art may also be used.

In some embodiments, the processes herein can perform the sequence of actions in a different order. In other embodiments, the processes can skip one or more of the actions. In still other embodiments, one or more of the actions are performed simultaneously. In some embodiments, additional actions can be performed. For example, in one aspect, the process may include any additional actions needed to fabricate the magnetic recording layer structure.

Additional Examples and Embodiments

Figure 9:
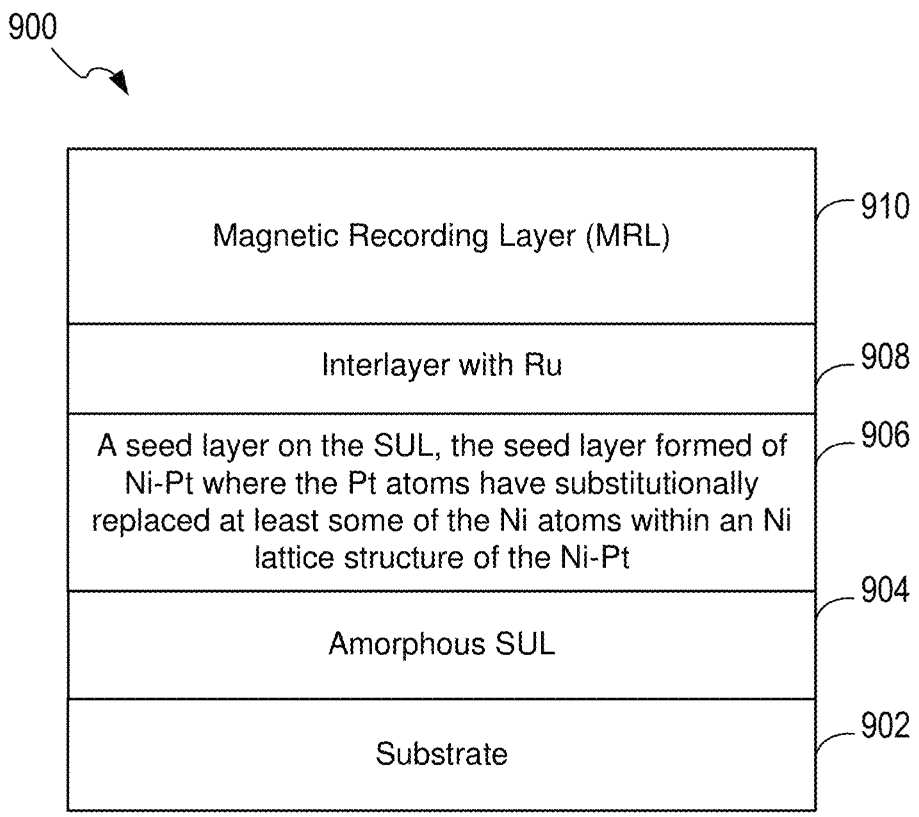
FIG. 9 is a side schematic view of an exemplary magnetic recording medium having an Ni—Pt seed layer wherein Pt atoms have substitutionally replaced Ni atoms, in accordance with another aspect of the disclosure.

FIG. 9 is a side schematic view of an exemplary magnetic recording medium 900 in accordance with another aspect of the disclosure. The magnetic recording medium 900 has a stacked structure with a substrate 902, an amorphous SUL 904 on the substrate 902, a seed layer 906 formed of Ni—Pt on the SUL where the Pt atoms have substitutionally replaced at least some of the Ni atoms within an Ni lattice structure of the Ni—Pt, an Ru-based IL 908 on the seed layer 906, and an MRL 910 on the Ru-based IL 908. The Ni—Pt seed layer 906 may be configured so that the seed layer has a lattice mismatch with the Ru-based interlayer 908 of 1% or less. The Ni—Pt seed layer may be, e.g., $Ni_{40}Pt_{60}$. The magnetic recording medium 900 may be a PMR medium. Other layers or films may be provided as well, as described above.

Figure 10:
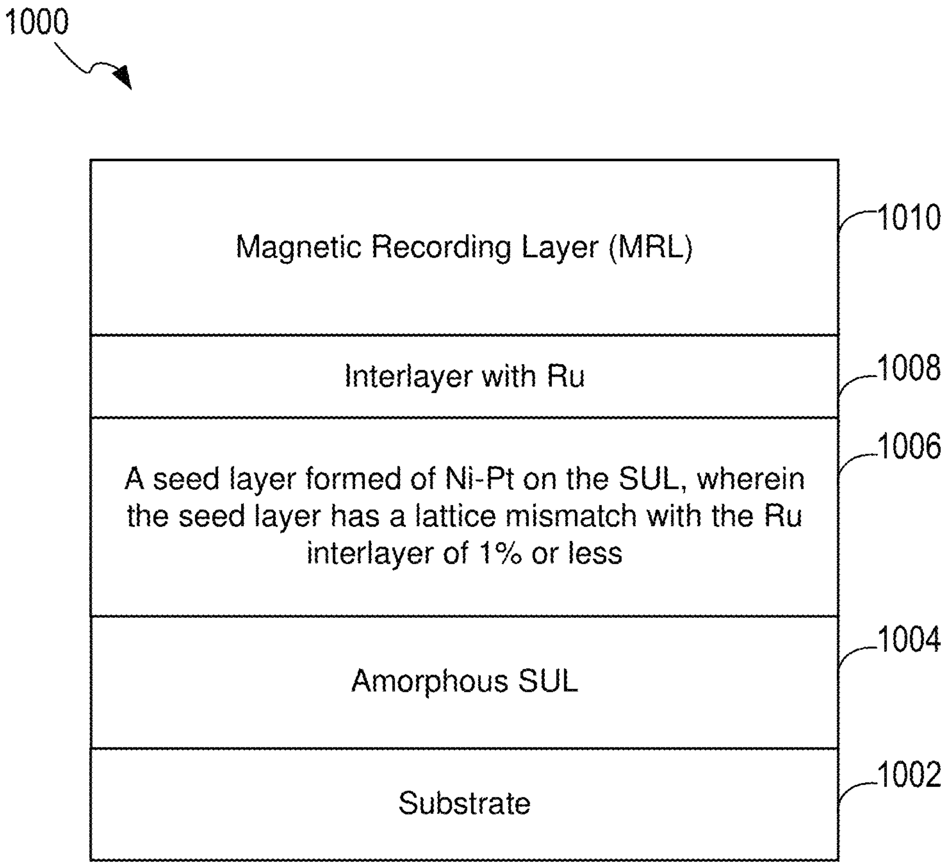
FIG. 10 is a side schematic view of another exemplary magnetic recording medium having an Ni—Pt seed layer wherein Pt atoms have substitutionally replaced Ni atoms, in accordance with another aspect of the disclosure.

FIG. 10 is a side schematic view of an exemplary magnetic recording medium 1000 in accordance with another aspect of the disclosure. The magnetic recording medium 1000 has a stacked structure with a substrate 1002, an amorphous SUL 1004 on the substrate 1002, a seed layer 1006 formed of Ni—Pt on the SUL 1004, an Ru-based IL 1008 on the seed layer 1006, and an MRL 1010 on the Ru-based IL 1008. The seed layer 1006 has a lattice mismatch with the Ru-based interlayer 1008 of 1% or less and, for example, less than 0.4%. This may be achieved, for example, by configuring the Ni—Pt seed layer 1006 to have Pt atoms substitutionally replacing Ni atoms with a suitable relative ratio of Ni to Pt, such as $Ni_{40}Pt_{60}$. The magnetic recording medium 1000 may be a PMR medium. Other layers or films may be provided as well, as described above.

Figure 11:
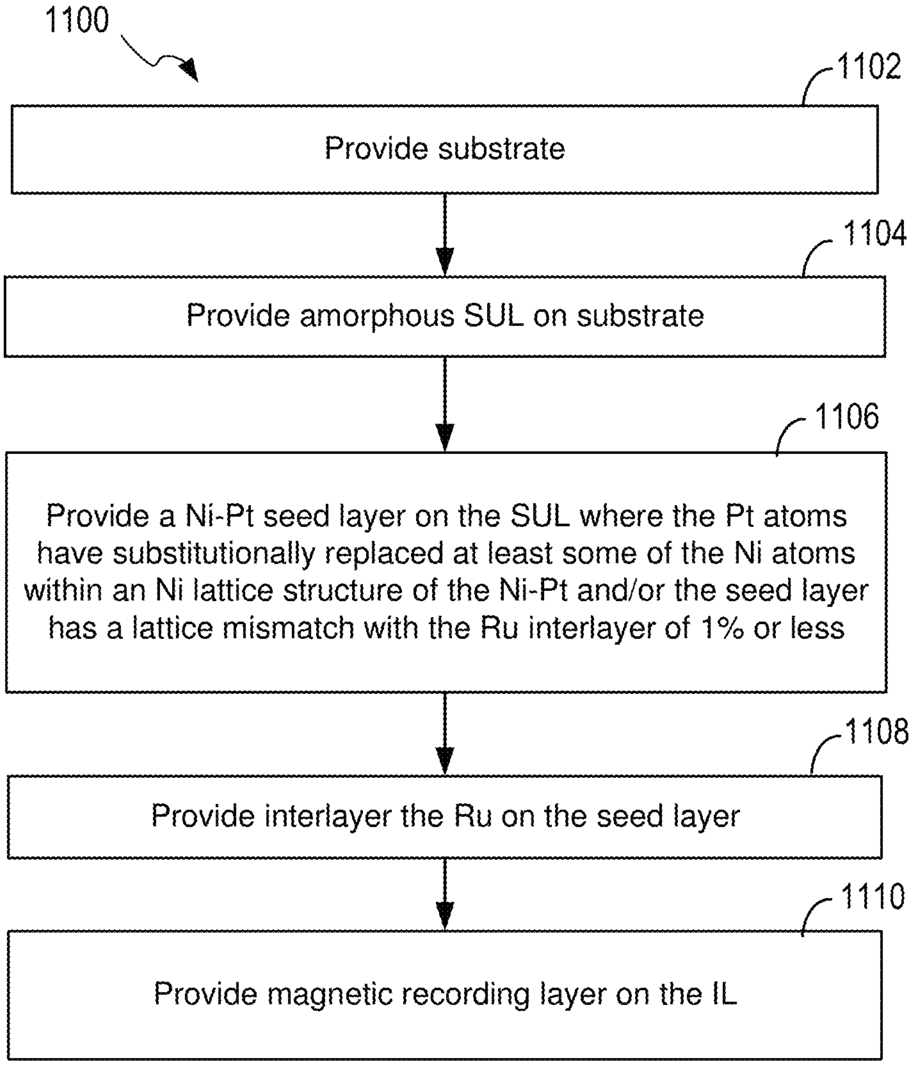
FIG. 11 is a side schematic view of another exemplary magnetic recording medium in accordance with aspects of the disclosure.

FIG. 11 is a flowchart of a process 1100 for fabricating a magnetic recording medium in accordance with some aspects of the disclosure. In one aspect, process 1100 can be used to fabricate the media described above in relation to FIGS. 9 and 10. In block 1102, the process provides a substrate. In block 1104, the process provides an amorphous SUL on the substrate. In block 1106, the process provides an Ni—Pt seed layer on the SUL where the Pt atoms have substitutionally replaced at least some of the Ni atoms within an Ni lattice structure of the Ni—Pt and/or with the seed layer having an in-plane lattice constant that differs from an in-plane lattice constant of an Ru-based interlayer by 1% or less. In block 1108, the process provides the Ru-based IL on the seed layer. In block 1110, an MRL is provided on the Ru-based IL. The medium that is fabricated may be a PMR medium. In other examples, more or fewer layers may be formed or otherwise provided.

ADDITIONAL ASPECTS AND CONSIDERATIONS

The terms "above," "below," and "between" as used herein refer to a relative position of one layer with respect to other layers. As such, one layer deposited or disposed above or below another layer may be directly in contact with the other layer or may have one or more intervening layers. Moreover, one layer deposited or disposed between layers may be directly in contact with the layers or may have one or more intervening layers.

While the above description contains many specific embodiments, these should not be construed as limitations on the scope of the invention, but rather as examples of specific embodiments thereof. Accordingly, the scope of the invention should be determined not by the embodiments illustrated, but by the appended claims and their equivalents.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

Various components described in this specification may be described as "including" or made of certain materials or compositions of materials. In one aspect, this can mean that the component consists of the particular material(s). In another aspect, this can mean that the component comprises the particular material(s).

As used herein, the term percent (%), where the unit is not specified, can be any one of weight %, atomic %, mole %, mass % or volume %.

The word "exemplary" is used herein to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. It is further noted that the term "over" as used in the present application in the context of one component located over another component, may be used to mean a component that is on another component and/or in another component (e.g., on a surface of a component or embedded in a component). Thus, for example, a first component that is over the second component may mean that (1) the first component is over the second component, but not directly touching the second component, (2) the first component is on (e.g., on a surface of) the second component, and/or (3) the first component is in (e.g., embedded in) the second component. The term "about 'value X'", or "approximately value X," as used in the disclosure shall mean within 10 percent of the 'value X'. For example, a value of about 1 or approximately 1 would mean a value in a range of 0.9-1.1. In the disclosure various ranges in values may be specified, described and/or claimed. It is noted that any time a range is specified, described and/or claimed in the specification and/or claim, it is meant to include the endpoints (at least in one embodiment). In another embodiment, the range may not include the endpoints of the range. In the disclosure various values (e.g., value X) may be specified, described and/or claimed. In one embodiment, it should be understood that the value X may be exactly equal to X. In one embodiment, it should be understood that the value X may be "about X," with the meaning noted above.

What is claimed is:

1. A magnetic recording medium comprising:
a substrate;
an amorphous soft magnetic underlayer (SUL) on the substrate;
a plurality of seed layers on the SUL, each of the plurality of seed layers comprising Ni—Pt where the Pt atoms have substitutionally replaced at least some of the Ni atoms within a corresponding Ni lattice structure of the Ni—Pt, wherein each of the plurality of seed layers has a different percentage of Pt in the Ni—Pt than any other seed layer of the plurality of seed layers, wherein the plurality of seed layers comprises:
a first seed layer comprising about 40 at. % Pt in the Ni—Pt,
a second seed layer on the first seed layer, the second seed layer comprising about 50 at. % Pt in the Ni—Pt, and
a third seed layer on the second seed layer, the third seed layer comprising about 60 at. % Pt in the Ni—Pt;
an interlayer comprising Ru on the seed layer; and
a magnetic recording layer (MRL) on the interlayer.

2. The magnetic recording medium of claim 1, wherein the Ni—Pt of each of the plurality of seed layers forms a face-centered cubic (FCC) lattice.

3. The magnetic recording medium of claim 1, wherein the Ni—Pt of each of the plurality of seed layers has a lattice constant in the range of 3.68 angstroms to 3.85 angstroms.

4. The magnetic recording medium of claim 1, wherein the Ni—Pt of at least one of the plurality of seed layers has a lattice mismatch with the interlayer of 5% or less.

5. The magnetic recording medium of claim 1, wherein the Ni—Pt of at least one of the plurality of seed layers has a lattice mismatch with the interlayer of 1% or less.

6. The magnetic recording medium of claim 1, wherein the Ni—Pt of at least one of the plurality of seed layers has a lattice mismatch with the interlayer of 0.4% or less.

7. The magnetic recording medium of claim 1, wherein each of the plurality of seed layers does not include an oxide.

8. A data storage device, comprising:

the magnetic recording medium of claim 1; and a recording head configured to write information to the magnetic recording medium.

9. A method for fabricating magnetic recording media, comprising:

providing a substrate;

providing an amorphous soft magnetic underlayer (SUL) on the substrate;

providing a plurality of seed layers on the SUL, each of the plurality of seed layers comprising Ni—Pt where the Pt atoms have substitutionally replaced at least some of the Ni atoms within a corresponding Ni lattice structure of the Ni—Pt, wherein each of the plurality of seed layers has a different percentage of Pt in the Ni—Pt than any other seed layer of the plurality of seed layers, wherein the plurality of seed layers comprises:

a first seed layer comprising about 40 at. % Pt in the Ni—Pt, a second seed layer on the first seed layer, the second seed layer comprising about 50 at. % Pt in the Ni—Pt, and a third seed layer on the second seed layer, the third seed layer comprising about 60 at. % Pt in the Ni—Pt;

providing an interlayer comprising Ru on the seed layer; and providing a magnetic recording layer (MRL) on the interlayer.

10. The method of claim 9, wherein the Ni—Pt of each of the plurality of seed layers has a lattice constant in the range of 3.68 angstroms to 3.85 angstroms.

11. The method of claim 9, wherein the Ni—Pt of at least one of the plurality of seed layers has a lattice mismatch with the interlayer of 5% or less.

12. The method of claim 9, wherein the Ni—Pt of at least one of the plurality of seed layers has a lattice mismatch with the interlayer of 1% or less.

13. The method of claim 9, wherein the Ni—Pt of at least one of the plurality of seed layers has a lattice mismatch with the interlayer of 0.4% or less.

* * * * *